United States Patent
Braun et al.

(12)

(10) Patent No.: US 6,458,858 B1
(45) Date of Patent: Oct. 1, 2002

(54) BIODEGRADABLE POLYESTER MATERIAL PARTICLES

(75) Inventors: Frank Braun, Ludwigshafen; Guiscard Glück, Mainz; Klaus Hahn, Kirchheim; Uwe Witt, Mutterstadt; Isidoor de Grave, Wachenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,509

(22) PCT Filed: May 3, 2000

(86) PCT No.: PCT/EP00/03970

§ 371 (c)(1),
(2), (4) Date: Nov. 13, 2001

(87) PCT Pub. No.: WO00/68303

PCT Pub. Date: Nov. 16, 2000

(30) Foreign Application Priority Data

May 10, 1999 (DE) .......................................... 199 21 385

(51) Int. Cl.$^7$ ................ C08J 9/18; C08J 9/22
(52) U.S. Cl. ........................ 521/60; 521/56; 521/138; 521/182
(58) Field of Search ............................ 521/56, 60, 138, 521/182

(56) References Cited

U.S. PATENT DOCUMENTS 6,306,921 B1 * 10/2001 Al Ghatta et al.

FOREIGN PATENT DOCUMENTS

| EP | 0 569 148 | 11/1993 |
|---|---|---|
| WO | WO 96/07687 | 3/1996 |

OTHER PUBLICATIONS

Patent Abstracts of Japan, JP 05–170965, Jul. 9, 1993.

* cited by examiner

*Primary Examiner*—Morton Foelak
(74) *Attorney, Agent, or Firm*—Oblon, Spivak, McClelland, Maier & Neustadt, P.C.

(57) ABSTRACT

In a process for preparing expanded or expandable polymer beads based on biodegradable saturated polyesters made from at least one diol and from at least one dicarboxylic acid,
  A. polymer pellets are dispersed in a liquid,
  B. a volatile blowing agent is injected into the dispersion and made to impregnate the pellets at an elevated temperature,
  C. the pressure on the dispersion is reduced at an elevated temperature, whereupon the pellets comprising blowing agent expand to give foam, and, respectively,
  D. the pellets are isolated from the liquid.

22 Claims, No Drawings

BIODEGRADABLE POLYESTER MATERIAL PARTICLES

The invention relates to expandable or expanded polymer beads based on biodegradable saturated polyesters.

It is known that some naturally occurring materials, e.g. cellulose and starch, are biodegradable, i.e. are decomposed by microorganisms, in particular during composting, to give low-molecular-weight substances. Some synthetic polymers, for example polyesters, are also biodegradable. Although purely aliphatic polyesters have good biodegradability they have low suitability for practical applications, since they have a low level of mechanical and thermal properties. In contrast, aromatic polyesters have good mechanical properties but are not biodegradable.

WO 96/07687 has disclosed that copolyesters in which the monomer components are firstly aliphatic diols and secondly aliphatic and aromatic dicarboxylic acids have good mechanical and thermal properties and are at the same time biodegradable. This publication also mentions foamed moldings, but says nothing about their production.

WO 96/15173 also describes biodegradable copolyesters made from aliphatic diols and from a mixture of adipic acid and terephthalic acid, which have been modified by incorporating other transesterification components. These polyesters can be used to produce foams, by mixing a polymer melt with blowing agents and extruding the mixture as a foam.

WO 97/43329 relates to biodegradable branched copolyesters with increased melt viscosity containing polyfunctional polyols and, respectively, polycarboxylic acids incorporated by condensation. Again, the copolyesters can be processed to give foams by extruding the melt.

Finally, WO 97/44388 also describes foams made from moisture-resistant biodegradable mixtures of naturally occurring polymers, e.g. starch, with polyesters having hydroxyl functions. These biodegradable materials, too, were foamed by extruding a foam.

A disadvantage of extruding foams is that they can produce only simply shaped foam moldings, e.g. sheets or profiles. It is known that foam moldings of any desired shape can be produced by expanding expandable or expanded polymer beads, e.g. those based on polystyrene and/or on polyolefins, to give a foam and sintering these.

It is an object of the present invention to provide expanded or expandable particles based on biodegradable polyesters. We have found that this object is achieved by means of the processes as claimed in claims 1 and, respectively, 2.

EP-A 601390 describes degradable moldings made from foamed polylactides produced by foaming a mixture of amorphous polylactide pellets comprising blowing agent and finely divided polylactide in which no blowing agent is present. The polylactide pellets comprising blowing agents may be attained by suspending polylactide pellets in water and injecting blowing agents, e.g. pentane, at pressures of up to 100 bar over a period of up to 10 h, at temperatures below 50° C. This is a very complicated and time-consuming operation. Moldings made from polylactides are not directly biodegradable. They first have to be hydrolyzed at elevated temperatures to give lactic acid, and this is then further biodegraded.

Polyesters suitable for the novel process are described in claims 3 and 4, and also in the publications which have been cited: WO 96/07687, WO 96/15173, WO 97/43329 and WO 97/44388.

Particularly preferred partly aromatic polyesters include polyesters which contain, as significant components:

a) an acid component made from
   a1) from 30 to 95 mol % of at least one aliphatic or cycloaliphatic dicarboxylic acid or ester-forming derivatives of these or mixtures of these,
   a2) from 5 to 70 mol % of at least one aromatic dicarboxylic acid or ester-forming derivatives of these, and
   a3) from 0 to 5 mol % of a compound containing sulfonate groups, and
b) a diol component made from at least one $C_2$–$C_{12}$ alkanediold or from a $C_5$–$C_{10}$ cycloalkanediol or mixtures of these, and also, if desired, one or more components selected from the group consisting of
c) a component selected from the group consisting of
   c1) at least one dihydroxy compound of the formula I containing ether functions

   $$HO-[(CH_2)_n-O]_m-H \qquad (I)$$

where n is 2, 3 or 4 and m is an integer from 2 to 250,
   c2) at least one hydroxycarboxylic acid of formula IIa or IIb

   $$HO-[-C(O)-T-T-]_pH \qquad (IIa)$$

(IIb)
   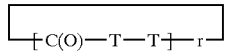

where p is an integer from 1 to 1500 and r is an integer from 1 to 4, and G is a radical selected from the group consisting of phenylene, —$(CH_2)_q$—, where q is an integer from 1 to 5, —C(R)H— and —C(R)HCH$_2$—, where R is methyl or ethyl,
   c3) at least one amino-$C_2$–$C_{12}$ alkanol or at least one amino-$C_5$–$C_{10}$ cycloalkanol or mixtures of these,
   c4) at least one diamino-$C_1$–$C_8$-alkane,
   c5) at least one 2,2'bisoxazoline of formula III (III)
   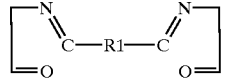

where $R^1$ is a single bond, $(CH_2)_z$-alkylene, where z=2, 3 or 4, or phenylene, and
   c6) at least one aminocarboxylic acid selected from the group consisting of the naturally occurring amino acids, polyamides with a molar mass of not more than 18000 g/mol obtainable by polycondensing a dicarboxylic acid having from 4 to 6 carbon atoms and a diamine having from 4 to 10 carbon atoms, compounds of the formulae IVa and IVb

   $$HO-[-C(O)-T-N(H)-]_sH \qquad (IVa)$$

(IVb)
   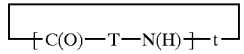

where s is an integer from 1 to 1500 and t is an integer from 1 to 4, and T is a radical selected from the group consisting of phenylene, —$(CH_2)_n$—, where n is an integer from 1 to 12, —$CR^2H$— and —$CR^2HCH_2$—, where $R^2$ is methyl or ethyl, and polyoxazolines with the repeat unit V

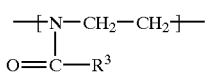
(V)

where $R^3$ is hydrogen, $C_1$–$C_6$-alkyl, $C_5$–$C_8$-cycloalkyl, phenyl, unsubstituted or substituted with up to three $C_1$–$C_4$-alkyl groups, or tetrahydrofuryl, or mixtures of c1 to c6,
and
d) a component selected from the group consisting of
d1) at least one compound having at least three groups capable of ester formation,
d2) at least one isocyanate,
d3) at least one divinyl ether,
or mixtures made from d1) to d3).

The acid component a in the partly aromatic polyesters comprises from 30 to 70 mol %, in particular from 40 to 60 mol %, of a1 and from 30 to 70 mol %, in particular from 40 to 60 mol %, of a2.

Possible aliphatic and, respectively, cycloaliphatic acids and the corresponding derivatives a1 are those mentioned above. Particular preference is given to adipic acid and sebacic acid, the ester-forming derivatives of each of these, or mixtures of these. Particular preference is given to adipic acid and its ester-forming derivatives, such as its alkyl esters or mixtures of these.

Aromatic dicarboxylic acids a2 which should be mentioned are generally those having from 8 to 12 carbon atoms, preferably 8 carbon atoms. Examples which may be mentioned are terephthalic acid, isophthalic acid, 2,6-naphthoic acid and 1,5-naphthoic acid, and also ester-forming derivatives of these, particularly the di-$C_1$–$C_6$-alkyl esters, e.g. dimethyl, diethyl, di-n-propyl, diisopropyl, di-n-butyl, diisobutyl, di-tert-butyl, di-n-pentyl, diisopentyl and di-n-hexyl esters. Other suitable ester-forming derivatives of the dicarboxylic acids of a2 are the anhydrides.

However, it is in principle also possible to use aromatic dicarboxylic acids a2 having a large number of carbon atoms, for example up to 20 carbon atoms.

The aromatic dicarboxylic acids and their ester-forming derivatives a2 may be used individually or as a mixture of two or more of these. Particular preference is given to terephthalic acid and its ester-forming derivatives, such as dimethyl terephthalate.

The polyesters preferably melt at from 70° to 150° C., in particular from 80° to 130° C. The saturated, partly aromatic polyesters under consideration here do not have precisely defined melting points, but rather a melting range. The impregnation according to the invention with the blowing agent should preferably be undertaken within this melting range.

The partly aromatic polyesters are characterized by a molar mass (Mn) of from 5000 to 100000 g/mol, in particular from 10000 to 40000 g/mol, with a viscosity number of from 50 to 400 ml/g, in particular from 100 to 300 ml/g (measured in o-dichlorobenzene/phenol, weight ratio of 50/50, at a concentration of 0.5% by weight of polymer at 25° C.).

The biodegradable polyesters may be blended with up to 200%, based on their weight, of other biodegradable polymers. Examples which should be mentioned are: cellulose and cellulose derivatives, starch and starch derivatives, polyhydroxyalkanoates, such as polyhydroxybutyrate and polylactides.

The biodegradable polymers may comprise additives, which may be incorporated during the polymerization procedure or subsequently, for example into a melt with the biodegradable polymers. Examples of additives are stabilizers, neutralizing agents, lubricants, mold-release agents, antiblocking agents, nucleating agents, non-fluorescing dyes and fillers.

From 0 to 80% by weight of additives may be added, based on the biodegradable polymers. Examples of suitable additives are carbon black, powdered lignin, cellulose fibers, natural fibers, such as sisal or hemp, iron oxides, clay minerals, ores, calcium carbonate, calcium sulfate, barium sulfate and titanium dioxide, stabilizers, such as tocopherol (Vitamin E), organic phosphorus compounds, mono-, di- or polyphenols, hydroquinones, diarylamines and thioethers. Examples of nucleating agents are talc, carbon black and graphite. Other additives which may be present are lubricants and mold-release agents based on hydrocarbons, on fatty alcohols, on higher carboxylic acids, on metal salts of higher carboxylic acids, such as calcium stearate or zinc stearate, or on montan waxes. These stabilizers, etc. are described in detail in Kunststoff-Handbuch, Vol. 3/1, Carl-Hanser Verlag, Munich, 1992, pp. 24–28.

The preparation of the expanded or expandable polymer beads starts from polyester pellets whose average diameter is preferably from 0.2 to 10 mm, in particular from 0.5 to 5 mm. 100 parts by weight of these pellets are dispersed in from 100 to 500 parts by weight of suspension medium in a stirred reactor.

The densities of the polymer pellets and of the suspension medium should be approximately matched to one another to ensure good distribution of the pellets in the stirred liquid. Since the density of the preferred polyesters is generally about 1.25 g/cm³, the density of the liquid should be above 1.0 g/cm³, preferably from 1.05 to 1.3 g/cm³ and in particular from 1.1 to 1.25 g/cm³. Examples of liquids are ethylene glycol and glycerol, and also mixtures of these with water. Another way of matching the densities is to use water as the liquid and use polymer pellets which have been foamed to a slight extent. The latter can be produced by mixing a melt of the polymer with a chemical blowing agent, e.g. azodicarbonamide or bicarbonate/citric acid, extruding the melt and pelletizing.

The dispersion may comprise from 0.01 to 5% by weight, based on the polymer pellets, of conventional suspension stabilizers, such as water-insoluble inorganic compounds, for example metal carbonates, metal phosphates or metal oxides, which are used together with surface-active substances, e.g. sulfonates or ethoxylates. If the density of the polymer pellets are higher than that of the suspension medium, suspension stabilizers can be dispensed with.

The blowing agents used may comprise either organic liquids or inorganic gases or mixtures of these. Possible liquids are halogenated hydrocarbons, but preference is given to saturated aliphatic hydrocarbons, in particular those having from 3 to 8 carbon atoms. n-Butane is particularly preferred. Suitable inorganic gases are nitrogen, air, ammonia and carbon dioxide. Ethanol is also suitable.

From 1 to 50 parts by weight, in particular from 3 to 30 parts by weight, of the blowing agent are used, based on 100 parts by weight of polymer. The blowing agent here may be added prior to or during the heating of the reactor contents.

During impregnation, the temperature should be above the softening point of the polymer. It may be from 40° C. below to 40° C. above the melting point (crystalline melting point from DSC), but should preferably be below the melting point.

Depending on the nature and amount of the blowing agent, and also on the temperature, the pressure arising in the reactor is generally higher than 2 bar and not more than 50 bar.

The impregnation has generally been completed after from 30 to 300 min.

When producing expanded polymer particles, the pressure on the dispersion is released at an elevated temperature, usefully at the impregnating temperature or somewhat below this.

In this case, the pellets impregnated with blowing agent expand to give foam beads with a diameter of from 1 to 20 mm, which are isolated from the suspension medium, washed and dried. Depending on the impregnation conditions, their bulk density may be from 10 to 300 g/l.

Expandable polymer beads are obtained if, after impregnation but before reducing the pressure, the dispersion is cooled to a large extent, usefully at room temperature. This gives polymer beads which comprise blowing agent but have not been expanded to give foam. These are stored and transported more readily than foam beads. They may be expanded by conventional methods, e.g. using steam or hot air, to give foam beads.

The novel foam beads may be further foamed and sintered as usual in closed molds, using steam or hot air, to give foam moldings with any desired shape.

Foam moldings made from the biodegradable foam beads may be used as disposable kitchenware or as packaging blocks, dishes or cups. These can be composted and thus degraded once they have been comminuted.

In the examples, all of the parts and percentages given are by weight.

EXAMPLE 1

60 parts of a polyester based on butanediol/terephthalic acid/adipic acid (molar ratio 100:50:50) are dispersed in 160 parts of ethylene glycol in a sealed tubular reactor. After introduction of 18 parts of butane and 5 bar of nitrogen the reactor is heated to about 110° C., whereupon the pressure rises to about 25 bar. The contents of the reactor are then released with pressure reduction into an intermediate vessel. The resultant foam beads have a bulk density of 60 g/l after drying.

EXAMPLE 2

60 parts of a polyester based on butanediol/terephthalic acid/adipic acid (molar ratio 100:50:50) are dispersed in 160 parts of ethylene glycol in a sealed tubular reactor. After introduction of 20 parts of butane and 5 bar of nitrogen the reactor is heated to about 115° C. The reactor contents are then cooled to room temperature. The beads obtained after drying are unfoamed and comprise blowing agent. These can be expanded to bulk densities below 100 g/l, using steam.

We claim:

1. A process for producing expanded polymer beads based on biodegradable saturated polyesters made from at least one diol and from at least one aliphatic and one aromatic dicarboxylic acid, and also, optionally, from other transesterification components, which comprises the following steps:
    A. polymer pellets are dispersed in a liquid,
    B. a volatile blowing agent is injected into the dispersion under pressure and made to impregnate the pellets at an elevated temperature,
    C. the pressure of the dispersion is reduced at an elevated temperature, whereupon the pellets comprising blowing agent expand to give foam, and
    D. the pellets are isolated from the liquid.

2. A process for producing expandable polymer beads based on biodegradable saturated polyesters made from at least one diol and from at least one aliphatic and one aromatic dicarboxylic acid, and also, if desired, from other transesterification components, which comprises the following steps:
    A. polymer pellets are dispersed in a liquid,
    B. a volatile blowing agent is injected into the dispersion under pressure and made to impregnate the pellets at an elevated temperature,
    C. the pressure of the dispersion is reduced after the dispersion has been cooled to room temperature, whereupon the pellets comprising blowing agent do not expand to give foam, and
    D. the pellets are isolated from the liquid.

3. A process as claimed in claim 1, wherein the polyester is a condensation product made from
    a) an acid component made from
        a1) from 30 to 70 mol % of at least one aliphatic or cycloaliphatic $C_2$–$C_{20}$ dicarboxylic acid or ester-forming derivatives of these and
        a2) from 30 to 70 mol % of at least one aromatic dicarboxylic acid or ester-forming derivatives of these, and
    b) a diol component from at least one $C_2$–$C_{12}$ alkanediol or from a $C_5$–$C_{10}$ cycloalkanediol,
    and melts at from 70 to 150° C.

4. A process as claimed in claim 1, wherein the saturated polyesters may be blended with up to 200%, based on their weight, of other biodegradable polymers, preferably naturally occurring polymers.

5. A process as claimed in claim 1, wherein the polyester has been branched by incorporating three- or multifunctional components and/or has been chain-lengthened by incorporating diisocyanates and/or has been modified using a hydroxycarboxylic acid.

6. A process as claimed in claim 1, wherein the polymer pellets used have not been foamed and the density of the liquid is from 1.05 to 1.3 g/cm².

7. A process as claimed in claim 5, wherein the liquid is ethylene glycol, glycerol or a mixture of these with water.

8. A process as claimed in claim 1, wherein the liquid is water and the pellets have been foamed to a small degree and their density is 1.0 g/cm³ or below.

9. A process as claimed in claim 1, wherein the volatile blowing agent is a $C_3$–$C_8$ hydrocarbon, ethanol, $CO_2$, $NH_3$, air, $N_2$ or mixtures of these.

10. A process as claimed in claim 1, wherein the impregnation in step B is carried out at pressure from 2 to 50 bar and at a temperature which is no more than 40° C. below, and not more than 40° C. above, the crystalline melting point (DSC maximum) of the polymer.

11. An expandable polymer bead material based on biodegradable saturated polyesters prepared as claimed in claim 2.

12. An expanded polymer bead material based on biodegradable saturated polyesters prepared as claimed in claim 1.

13. An expanded polymer bead material based on biodegradable saturated polyesters prepared by foaming the polymer beads as claimed in claim 10.

14. A process as claimed in claim 2, wherein the polyester is a condensation product made from
    a) an acid component made from
        a1) from 30 to 70 mol % of at least one aliphatic or cycloaliphatic $C_2$–$C_{20}$ dicarboxylic acid or ester-forming derivatives of these and
        a2) from 30 to 74 mol % of at least one aromatic dicarboxylic acid or ester-forming derivatives of these, and b) a diol component from at leant one $C_2$–$C_{12}$ alkanediol or from a $C_5$–$C_{10}$ cycloalkanediol, and melts at from 70 to 150° C.

15. A process as claimed in claim 2, wherein the saturated polyesters may be blended with up to 200%, based on their weight, of other biodegradable polymers, preferably naturally occurring polymers.

16. A process as claimed in claim 2, wherein the polyester has been branched by incorporating three- or multifunctional components and/or has been chain-lengthened by incorporating diisocyanates and/or has been modified using a hydroxycarboxylic acid.

17. A process as claimed in claim 2, wherein the polymer pellets used have not been foamed and the density of the liquid is from 1.05 to 1.3 g/cm².

18. A process as claimed in claim 16, wherein the liquid is ethylene glycol, glycerol or a mixture of these with water.

19. A process as claimed in claim 2, wherein the liquid is water and the pellets have been foamed to a small degree and their density is 1.0 g/cm³ or below.

20. A process as claimed in claim 2, wherein the volatile blowing agent is a $C_3$–$C_8$ hydrocarbon, ethanol, $CO_2$, $NH_3$, air, $N_2$ or mixtures of these.

21. A process as claimed in claim 2, wherein the impregnation in step B is carried out at pressure from 2 to 50 bar and at a temperature which is no more than 40° C. below, and not more than 40° C. above, the crystalline melting point (DSC maximum) of the polymer.

22. An expanded polymer bead material based on biodegradable saturated polyesters prepared by foaming the polymer beads as claimed in claim 21.

* * * * *